(No Model.)
H. B. HANMORE & T. N. McLEAN.
CAR BRAKE.
No. 495,799. Patented Apr. 18, 1893.
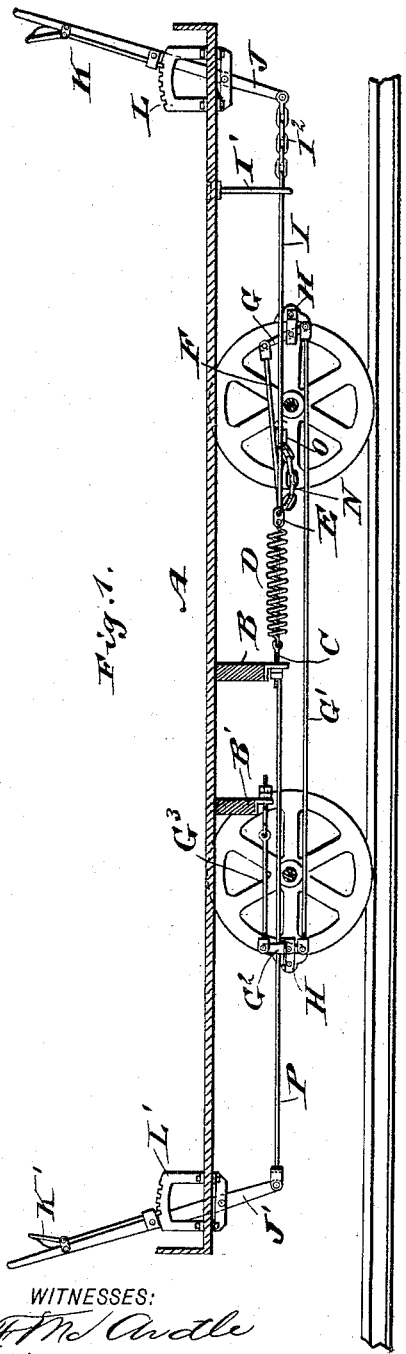
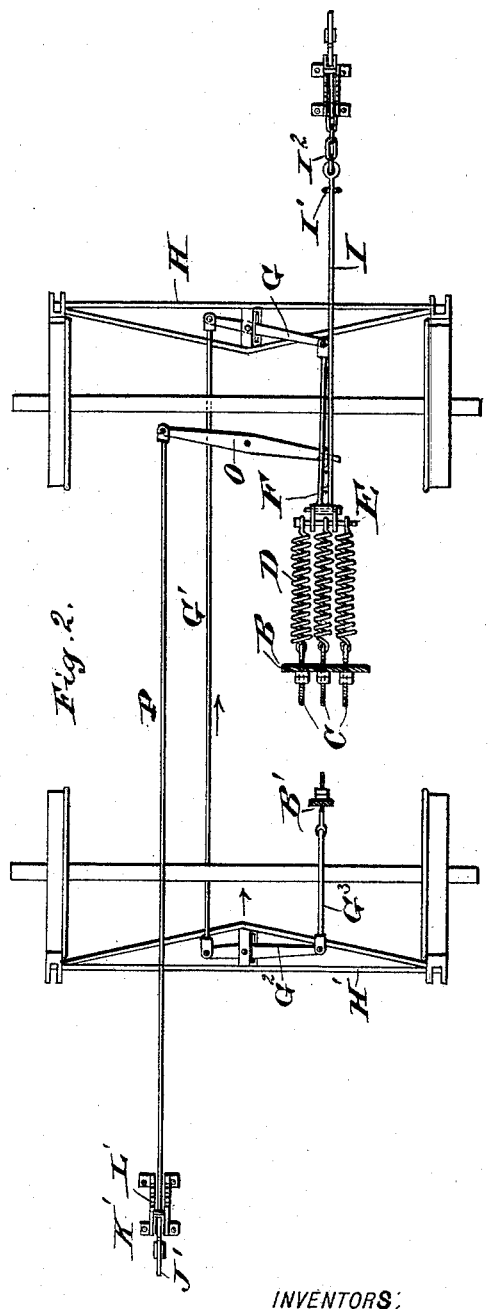
WITNESSES:
F. McArdle
C. Sedgwick
INVENTORS:
H. B. Hanmore
T. N. McLean
BY Munn & Co.
ATTORNEYS.

UNITED STATES PATENT OFFICE.

HOWARD B. HANMORE, OF ST. PAUL, AND THOMAS N. McLEAN, OF FERGUS FALLS, MINNESOTA.

CAR-BRAKE.

SPECIFICATION forming part of Letters Patent No. 495,799, dated April 18, 1893.

Application filed September 28, 1892. Serial No. 447,133. (No model.)

*To all whom it may concern:*

Be it known that we, HOWARD B. HANMORE, of St. Paul, in the county of Ramsey, and THOMAS N. McLEAN, of Fergus Falls, in the county of Otter Tail, State of Minnesota, have invented a new and Improved Car-Brake, of which the following is a full, clear, and exact description.

The object of the invention is to provide a new and improved car brake, which is simple and durable in construction, very effective in operation, quick acting, applied in an instant, and arranged to prevent sliding of the wheels on the rails and decreasing the wear and tear to a minimum.

The invention consists of certain parts and details, and combinations of the same, as will be hereinafter described and then pointed out in the claims.

Reference is to be had to the accompanying drawings forming a part of this specification, in which similar letters of reference indicate corresponding parts in both the figures.

Figure 1 is a sectional side elevation of the improvement as applied; and Fig. 2 is a plan view of the same with the car body removed and parts in section.

On the under side of the car body A, is secured a transversely-extending keeper B, on which is held a series of eye bolts C, each connected with one end of a coil spring D, extending longitudinally under the car body A. The forward ends of the springs D are connected with a bolt E, pivotally-connected by a link F, with a brake lever G, held on the brake beam H, carrying at its ends, the brake shoes adapted to engage the flanges of the forward wheels. The brake lever G is also pivotally-connected by a link G', with the second brake lever $G^2$, held on the second brake beam H', carrying shoes engaging the other set of car wheels. The second brake lever $G^2$ is pivotally-connected by a link $G^3$, with a bracket B', fixed on the under side of the car body A. We do not limit ourselves to any special construction of the brake mechanism shown and above described, as it is understood that the springs are connected with such brake mechanism to actuate the same in the manner hereinafter more fully described. The bolt E is also connected with a rod I, extending forwardly and guided in a keeper I', projecting from the under side of the car body A. The forward end of the rod I is connected by a chain $I^2$, with a lever J, fulcrumed at the forward end of the car A at the platform thereof, the said lever projecting forwardly so as to be under the control of the operator standing on that end of the car. The lever J is provided with a hand lever K, adapted to engage one of a series of notches in a segment L, secured on this end of the car body A. The bolt E is also connected by a chain N, with a lever O, extending transversely and fulcrumed on the under side of the car body A on a suitable bracket or other support the said lever being pivotally connected by a link P, with a second hand lever J', fulcrumed on the opposite end of the car to that on which the lever J is located. This lever J' is also provided with a hand lever K' adapted to engage one of a series of notches on the segment L'.

The operation is as follows: The springs D are held under such tension as to apply the brake shoes on the flanges of the wheels, it being understood that the springs in acting on the brake levers G and $G^2$ and the brake beams H and H', draw the latter toward each other, so as to apply the shoes. When it is desired to move the brake shoes out of contact with the wheels, the operator on either end of the car pulls the respective lever J or J' backward, so that the respective rod I or P is pulled outward, and the tension of the springs D is increased by opening the spring, as the said rods I and P act on the bolt E for this purpose. The forward movement of this bolt causes the link F to push on the brake lever G, so that the brake beam H is moved outward and its shoes disengage from the flange of the respective wheel. At the same time, the action of the link on the brake lever G causes the latter to push the brake lever $G^2$ so that the other brake beam H' is also released. It will be seen that by this backward movement of either of the levers J or J', the brakes are released at the same time the tension of the springs D is increased, and the lever is locked in position by the respective hand lever K or K', engaging a registering notch in the segment L or L', respectively.

Now, when it is desired to apply the brakes, the operator first disengages the hand lever K or K' from the respective segment L or L' so as to unlock the springs D which by their force exert a pull on the link F, whereby both brake beams H and H' are moved toward each other, and the brake shoes are applied on the flanges of the wheels.

It will be seen that the operator in unlocking the springs D by withdrawing either of the hand levers K or K' from the respective notch in the segments L or L', can graduate the force of the springs by moving the corresponding lever J or J' outward to a desired point and then again permitting the respective lever K or K' to engage a corresponding notch in the segment L or L'. Thus it will be seen that the force with which the brake shoes are applied on the wheels is fully under the control of the operator manipulating either of the hand levers J or J'. It will be seen that by this construction, the operator cannot increase the power more than the co-efficient between the load and the rail, thus preventing the wheels from sliding on the rails, and at the same time lessening the co-efficient of friction and the liability to destruction of the wheels.

Having thus fully described our invention, we claim as new and desire to secure by Letters Patent—

1. In a car brake, the combination with the brake beams, of brake levers on the brake beams and connected together, springs under the car body, a link connecting the springs with one brake lever, a link connecting the other brake lever with a fixed support, and operating levers connected with the springs, substantially as described.

2. In a car brake, the combination with the brake beams H H', of the springs D arranged on the under side of the car body and connected to the bolt E, the brake levers G G$^2$ on the brake beams, the link F connecting the bolt E with the brake lever G, the link G$^3$ connecting the brake lever G$^2$ with the bracket B', the link G' connecting the brake levers together, the operating levers J J', and connections between the said levers and the bolt E, substantially as described.

3. In a car brake, the combination with the brake beams H H', of the brake levers G G$^2$, springs D, the bolt E to which the springs are connected, the link F connecting the bolt with the lever G, the link G' connecting the levers G G$^2$ together, the link G$^3$ connecting the lever G$^2$ with the bracket B' on the under side of the car, the lever J, the link I connecting the lever J with the bolt E, the lever O connected by chain N with the bolt E, the lever J' and the link P connecting the lever J' and the lever O, together, substantially as described.

HOWARD B. HANMORE.
THOMAS N. McLEAN.

Witnesses to the signature of Howard B. Hanmore:
C. W. PETTINGILL,
AUGUST E. KREBS.

Witnesses to the signature of Thomas N. McLean:
D. M. BROWN,
F. C. E. LOCKHARD.